(12) United States Patent
Sen

(10) Patent No.: US 10,321,266 B2
(45) Date of Patent: Jun. 11, 2019

(54) DISTANCE ESTIMATION

(71) Applicant: Hewlett Packard Enterprise Development LP, Houston, TX (US)

(72) Inventor: Souvik Sen, Mountain View, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/117,888

(22) PCT Filed: Feb. 10, 2014

(86) PCT No.: PCT/US2014/015621
§ 371 (c)(1),
(2) Date: Aug. 10, 2016

(87) PCT Pub. No.: WO2015/119635
PCT Pub. Date: Aug. 13, 2015

(65) Prior Publication Data
US 2017/0013403 A1     Jan. 12, 2017

(51) Int. Cl.
*H04W 4/02*     (2018.01)
*H04B 17/27*    (2015.01)
*H04W 64/00*    (2009.01)

(52) U.S. Cl.
CPC ............ *H04W 4/023* (2013.01); *H04B 17/27* (2015.01); *H04W 64/003* (2013.01); *H04W 64/006* (2013.01)

(58) Field of Classification Search
CPC . H04W 4/023; H04W 64/003; H04W 64/006; H04B 17/27
See application file for complete search history.

(56) References Cited

U.S. PATENT DOCUMENTS

| 7,116,632 | B2 | 10/2006 | Alapuranen |
| 7,576,694 | B2 | 8/2009 | Anjum et al. |
| 7,769,542 | B2 | 8/2010 | Calvarese et al. |
| 8,200,251 | B2 * | 6/2012 | Huang ................ G06F 17/3087 |
| | | | 455/404.2 |
| 8,209,251 | B2 | 6/2012 | Huang |
| 8,521,091 | B2 | 8/2013 | Miscopein et al. |

(Continued)

FOREIGN PATENT DOCUMENTS

| JP | 2010-537520 A | 12/2010 |
| KR | 10-2011-0012899 A | 2/2011 |
| WO | WO-2009054010 | 4/2009 |

OTHER PUBLICATIONS

Sen et al, You are facing the Mona Lisa: Spot localization using PHY layer information, Proceedings of ACM International Conference on Mobile Systems, Applications, and Services (MobiSys'12), Jun. 25-29, 2012, pp. 183-196.*

(Continued)

*Primary Examiner* — Shailendra Kumar
(74) *Attorney, Agent, or Firm* — Hewlett Packard Enterprise Patent Department

(57) ABSTRACT

A distance estimate between two nodes may be determined from a path loss exponent and a direct path energy estimate. The direct path energy estimate may be determined from channel state information of a packet received from one of the nodes. The path loss exponent may be determined from the direct path energy estimate and a received signal strength indicator.

14 Claims, 7 Drawing Sheets

(56) References Cited

U.S. PATENT DOCUMENTS

| | | | |
|---|---|---|---|
| 9,867,091 | B2 | 1/2018 | Jo et al. |
| 2006/0290567 | A1 | 12/2006 | Ramos |
| 2008/0120062 | A1 | 5/2008 | Lee et al. |
| 2008/0248741 | A1 | 10/2008 | Alizadeh-Shabdiz |
| 2009/0028112 | A1 | 1/2009 | Attar et al. |
| 2012/0264447 | A1 | 10/2012 | Rieger |
| 2013/0051255 | A1* | 2/2013 | Estevez .............. H04W 64/00 370/252 |
| 2013/0122935 | A1 | 5/2013 | Das et al. |
| 2013/0194951 | A1 | 8/2013 | Kim et al. |
| 2013/0225200 | A1 | 8/2013 | Hamida et al. |
| 2014/0274115 | A1 | 9/2014 | Michalson et al. |
| 2014/0302870 | A1 | 10/2014 | Cui et al. |

OTHER PUBLICATIONS

Sen et al., SpinLoc: Spin once to know your location, Proceedings of ACM Workshop on Mobile Computing Systems and Applications (HotMobile'12), Feb. 28-29, 2012.*

Zheng et al., From RSSI to CSI: Indoor Localization via Channel Response, ACM Computing Surveys, vol. 46, No. 2, Article 25, Nov. 2013.*

Small et al., Determining User Location for Context Aware Computing Through the Use of a Wireless LAN Infrastructure, Carnegie Mellon University, Research Paper, Nov. 29, 2000. (Year: 2000).*

Dobbins, R et al, "Software Defined Radio Localization lasing 802.11 style Communications" Apr. 28, 2011.

Karapistoli, E et al, "An Overview of the IEEE 802.15.4a Standard", Jan. 27, 2010.

Zheng, Yang et al, "From RSSI to CSI: Indoor Localization via Channel Response" ACM Computing Surveys, V46(2), Article 25, Nov. 2013.

Sen, S., et al.; "Non-Final Office Action cited in U.S. Appl. No. 15/114,875"; dated Feb. 9, 2017; 12 pages.

Small, J. et al., Determining User Location for Context Aware Computing Through the Use of a Wireless LAN Infrastructure, (Research Paper), Nov. 29, 2000, 8 Pgs.

Zijlstra, Wiebren, "Assessment of spatio-temporal parameters during unconstrained walking", European Journal of Applied Physiology, vol. 92, 2004, pp. 39-44.

Zheng, Yang at al, "From RSSI to CSI: Indoor Localization via Channel Response" ACM Computing Surveys, V46(2), Article 25, Nov. 2013, 32 Pgs.

Zhang et al., I Am the Antenna: Accurate Outdoor AP Location using Smartphones, ACM Mobicom, 2011, 22 pages.

Youssef et al., "The Horus WLAN Location Determination System", MobiSys '05 Proceedings of the 3rd international conference on Mobile systems, applications, and services, 2005, pp. 205-218.

Youssef et al., "PinPoint: An Asynchronous Time-Based Location Determination System," MobiSys '06 Proceedings of the 4th international conference on Mobile systems, applications and services, Jun. 2006, pp. 165-176.

Yang Xiao, "IEEE 802.11n: enhancements for higher throughput in wireless LANs", IEEE Wireless Communications, vol. 12, Issue 6, Dec. 2005, pp. 82-91.

Yang et al., "Locating in Fingerprint Space: Wireless Indoor Localization with Little Human Intervention", Mobicom '12 Proceedings of the 18th annual international conference on Mobile computing and networking, Aug. 2012, pp. 269-280.

Yang et al., "HCRL: A Hop-Count-Ratio based Localization in Wireless Sensor Networks," 2007 4th Annual IEEE Communications Society Conference on Sensor, Mesh and Ad Hoc Communications and Networks, 2007, pp. 35-37.

Xiong et al., "Towards fine-grained radio-based indoor location," HotMobile '12 Proceedings of the Twelfth Workshop on Mobile Computing Systems & Applications, Article No. 13, Feb. 2012, 6 pages.

Xiong et al., "SecureAngle: Improving Wireless Security Using Angle-of-Arrival Information," Hotnets, Oct. 2010, 6 pages.

Xiong et al., "ArrayTrack: A Fine-Grained Indoor Location System", 10th USENIX Symposium on Networked Systems Design and Implementation (NSDI '13), pp. 71-84.

Wu et al., "FILA: Fine-grained indoor localization," 2012 Proceedings IEEE INFOCOM, Mar. 2012, 38 pages.

Whitehouse et al., "A practical evaluation of radio signal strength for ranging-based localization," ACM SIGMOBILE Mobile Computing and Communications, vol. 11, Issue 1, Jan. 2007, pp. 41-52.

Werb et al., "Designing a positioning system for finding things and people indoors", IEEE Spectrum, vol. 35, Issue 9, Sep. 1998, pp. 71-78.

Weinberg, Harvey, "Using the ADXL202 in Pedometer and Personal Navigation Applications", Analog Devices, Inc., echnical Report AN-602, 2002, 8 pages.

Wang et al., "No Need to War-Drive: Unsupervised Indoor Localization", MobiSys '12 Proceedings of the 10th international conference on Mobile systems, applications, and services, Jun. 25-29, 2012, pp. 197-210.

Wang et al., "Unsupervised indoor localization", MobiSys'12, Jun. 25-29, 2012, 14 pages.

Tarighat et al., "Improved wireless location accuracy using antenna arrays and interference cancellation," 2003 IEEE International Conference on Acoustics, Speech, and Signal Processing, 2003. Proceedings. (ICASSP '03), Apr. 2003.

Savvides et al., "Dynamic fine-grained localization in Ad-Hoc networks of sensors," MobiCom '01 Proceedings of the 7th annual international conference on Mobile computing and networking, 2001, pp. 166-179.

Rodolfo, Margaria, "Biomechanics and energetics of muscular exercise", 1976, 156 pages.

Rappaport, Theodore, "Wireless Communications: Principles and Practice, 2nd Edition," Prentice Hall, 2002.

Rai et al., "Zee: Zero-Effort Crowdsourcing for Indoor Localization", Mobicom '12 Proceedings of the 18th annual international conference on Mobile computing and networking, Aug. 2012, pp. 293-304.

Rai et al., "Zee: zero-effort crowdsourcing for indoor localization", In Proceedings of ACM International Conference on Mobile Computing and Networking, Aug. 22-26, 2012, 12 pages.

Priyantha, Nissanka Bodhi, "The Cricket indoor location system," Massachusetts Institute of Technology, PhD thesis, 2005, 199 pages.

Park et al., "Online pose classification and walking speed estimation using handheld devices", UbiComp '12 Proceedings of the 2012 ACM Conference on Ubiquitous Computing, 2012, 10 pages.

Ong et al., "IEEE 802.11ac: Enhancements for very high throughput WLANs", 22nd IEEE Personal Indoor Mobile Radio Communications, 2011, pp. 854-858.

Niculescu et al., "VOR base stations for indoor 802.11 positioning," MobiCom '04 Proceedings of the 10th annual international conference on Mobile computing and networking, Sep. 2004, pp. 58-69.

Niculescu et al., "Ad hoc positioning system (APS) using AOA", In IEEE Infocom 2003, Twenty-second Annual Joint Conference of the IEEE Computer and Communications Societies (IEEE Cat. No. 03CH37428), 2003, 10 pages.

Nandakumar et al., "Centaur: Locating Devices in an Office Environment", Mobicom '12 Proceedings of the 18th annual international conference on Mobile computing and networking, 2012, pp. 281-292.

Li et al., "A Reliable and Accurate Indoor Localization Method Using Phone Inertial Sensors", UbiComp '12 Proceedings of the 2012 ACM Conference on Ubiquitous Computing, Sep. 2012, pp. 421-430.

Jami et al., "Improved method for estimating angle of arrival in multipath conditions using the 'MUSIC' algorithm," 2000 IEEE-APS Conference on Antennas and Propagation for Wireless Communications (Cat. No. 00EX380), Nov. 2000.

Hightower et al., "Particle Filters for Location Estimation in Ubiquitous Computing: A Case Study", International Conference on Ubiquitous Computing, UbiComp 2004, pp. 88-106.

Hightower et al., "Location Systems for Ubiquitous Computing", Computer, vol. 34, Issue 8, Aug. 2001, pp. 57-66.

(56) References Cited

OTHER PUBLICATIONS

Gu et al., "A Survey of Indoor Positioning Systems for Wireless Personal Networks", IEEE Communications Surveys & Tutorials, vol. 11, Issue 1, 2009, pp. 13-32.

Griswold et al., "ActiveCampus: experiments in community-oriented ubiquitous computing", Computer, vol. 37, Issue 10, Oct. 2004, pp. 73-81.

Giustiniano et al., "CAESAR: Carrier Sense-Based Ranging in Off-The-Shelf 802.11 Wireless LAN", CoNEXT '11 Proceedings of the Seventh Conference on Emerging Networking Experiments and Technologies, Article No. 10, Dec. 2011, 36 pages.

Fontana et al., Commercialization of an ultra wideband precision asset location system, IEEE Conference on Ultra Wideband Systems and Technologies, Nov. 2003, pp. 147-150.

Cong et al., "Hybrid TDOA/AOA mobile user location for wideband CDMA cellular systems," IEEE Transactions on Wireless Communications, vol. 1, Issue 3, Jul. 2002, pp. 439-447.

Cisco, "Radio Resource Management under Unified Wireless Networks", Cisco Whitepaper, Document ID: 71113, 31 pages.

Cho et al., "AutoGait: A mobile platform that accurately estimates the distance walked", IEEE International Conference on Pervasive Computing and Communications (PerCom), 2010, 15 pages.

Chintalapudi et al., "Indoor Localization Without the Pain", MobiCom '10 Proceedings of the sixteenth annual international conference on Mobile computing and networking, Sep. 2010, pp. 173-184.

Chintalapudi et al., "Ad-hoc localization using ranging and sectoring," IEEE INFOCOM, 2004, 11 pages.

Cheng et al., "TPS: A Time-Based Positioning Scheme for Outdoor Wireless Sensor Networks," IEEE Infocom 2004, 2004, pp. 2685-2696.

Cheng et al., "Accuracy characterization for metropolitan-scale Wi-Fi localization", MobiSys '05 Proceedings of the 3rd international conference on Mobile systems, applications, and services, Jun. 2005, pp. 233-245.

Banerjee et al., "Virtual Compass: Relative Positioning to Sense Mobile Social Interactions," International Conference on Pervasive Computing, Pervasive Computing, 2010, pp. 1-21.

Bahl et al., "RADAR: An In-Building RF-based User Location and Tracking System", IEEE INFOCOM, Mar. 2000, pp. 775-784.

Aruba Networks, "Bring your own ipad to work", Aruba White paper, 8 pages.

Aruba Networks, "Configuring Adaptive Radio Management (ARM) Profiles and Settings", Aruba Whitepaper, 13 pages.

* cited by examiner

DISTANCE ESTIMATION

BACKGROUND

Ranging techniques between connected network nodes may be used to determine the distance between the nodes. For example, ranging between a wireless access point (AP) and a mobile device may be used to localize the device indoors or in other places where satellite navigation is unavailable. As another example, ranging may be used in some routing protocols in sensor networks.

BRIEF DESCRIPTION OF THE DRAWINGS

Certain examples are described in the following detailed description and in reference to the drawings, in which.

DETAILED DESCRIPTION OF SPECIFIC EXAMPLES

Some ranging techniques involve the exchange of packets between a first network node and a second network node. For example, ranging may be performed using echo techniques where a first node transmits a data packet to a second node and the second node responds with an acknowledgement (ACK). The difference between the time of arrival (ToA) of the ACK at the first node and time of departure (ToD) of the data packet from the first node captures the time of flight (ToF) between the nodes and an idle time $t_{idle}$ before the second node transmits the ACK. ToA determination may be susceptible to uncertainty in detection of the preamble of the ACK. For example, multipath interference may contribute to uncertainty in preamble detection. This may result in a corresponding uncertainty in ToF determination.

Other ranging techniques estimate distance using the path loss equation:

$$P_R = P_0 - 10\gamma \log(d), \quad (1)$$

where $P_0$ is the received energy at a distance of 1 m from the transmitter, $P_R$ is the received energy at the receiver, $\gamma$ is the path loss exponent, and d is the distance between the transmitter and the receiver. $P_0$ may be known for certain signals, such as ACK packets transmitted in accordance with an 802.11 specification. In some cases, a received signal strength indicator (RSSI) may be used as $P_R$. However, the RSSI in a union of energy from all signal paths, include direct and indirect paths. Accordingly, use of RSSI in the path loss equation may result in uncertainty in the distance estimation.

Some aspects of the disclosed technology may determine the energy of a signal travelling on a direct path between two nodes. This direct path energy (DPE) may be used in distance estimation between the two nodes as part of ToF determination and length estimation using the path loss equation. Use of the DPE may reduce the effects of multi-path on distance estimation, increasing the accuracy of the distance estimation.

The time of flight (ToF) of a packet and its ACK between two nodes is related to the length (l) between the two nodes by the following relation:

$$l = \frac{TOF}{2} * C, \quad (2)$$

where c is the speed of light. Accordingly, an estimate of the distance between the two nodes may be expressed as an estimate of the time of flight between two nodes or as an estimate of the length between the two nodes.

Figure 1:
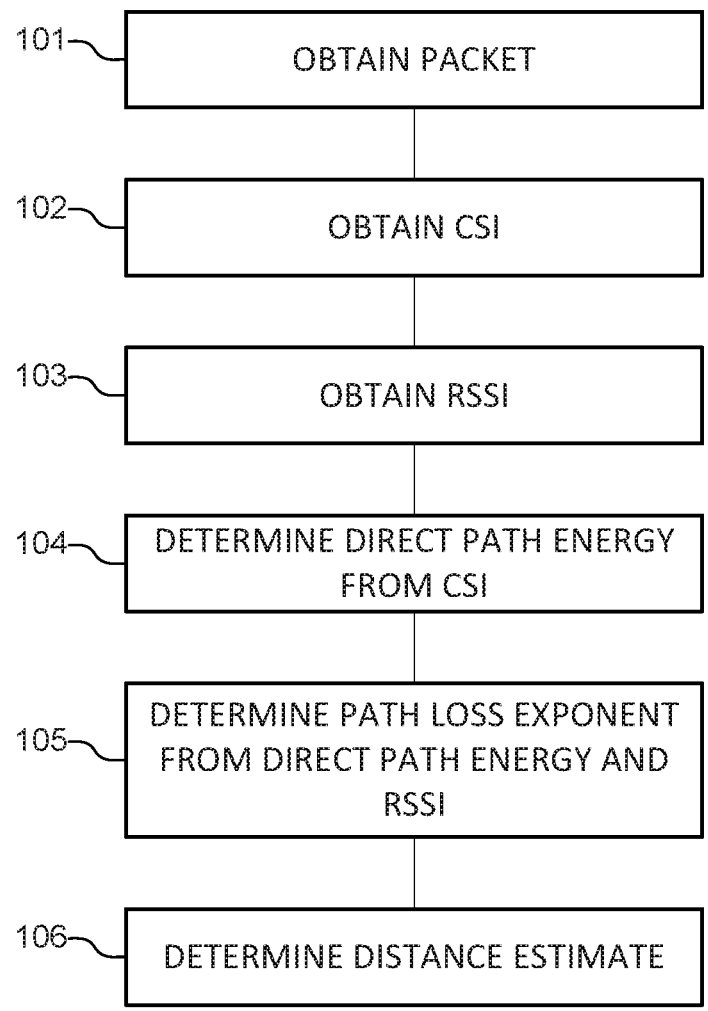
FIG. 1 illustrates an example method of distance estimation using a path loss exponent and direct path energy estimate.

FIG. 1 illustrates an example method of distance estimation using a path loss exponent and DPE estimate. For example, the example method may be performed by a wireless access point (AP) connected to a mobile device in accordance with an 802.11x protocol.

The example method may include block 101. Block 101 may include receiving, at a receiving node, a packet from a transmitting node. For example, the receiving node may be an AP receiving an ACK from a mobile device in response to a previously transmitted data packet. As another example, the receiving node may be a mobile device receiving a data packet from an AP.

The example method may further include block 102. Block 102 may include obtaining channel state information (CSI) from the packet. The CSI may reflect the delay and attenuation of different signal paths and different subcarriers of a transmitted symbol. The quality of a received symbol Y of a transmitted symbol X depends on the CSI, H, as follows:

$$Y = H*X+n, \quad (3)$$

where n is noise. In some implementations, the CSI may be provided by the physical layer module (PHY) of the receiving node's transceiver.

The example method may further include block 103. Block 103 may include obtaining a received signal strength indicator (RSSI) from the packet. In some implementations, the RSSI may be provided by the receiving node's PHY.

Figure 2A:
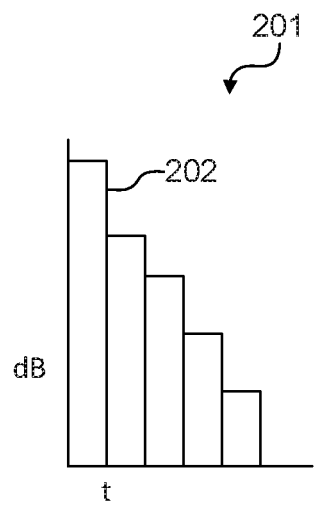
FIGS. 2A and 2B illustrate two examples of power delay profiles.
Figure 2B:
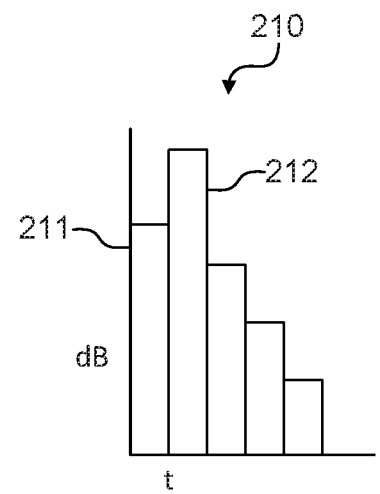

The example method may further include block 104. Block 104 may include determining a direct path energy estimate (DPE) from the CSI. For example, the CSI may be used to determine a power delay profile for the signal by performing an Inverse Fourier Transform, such as an Inverse Fast Fourier Transform (IFFT), on the CSI. In some implementations, the power delay profile may correspond to the signal strength received at a receiving antenna indexed by time. For example, FIGS. 2A and 2B illustrate two examples of power delay profiles 201, 210. The resolution of the power delay profile may be related to the bandwidth of the signal. For example, a 40 MHz 802.11n reception has a resolution of approximately 25 ns. Accordingly, in FIG. 2B, component 212 corresponds to the strength of the signal received 25 ns after the component 211. In some implementations, the direct path energy estimate may be selected as the first component of the power delay profile.

In some environments, the direct path between the receiver and the transmitter may have the strongest component in the power delay profile. For example, in FIG. 2A, the strongest component 202 of the power delay profile 201 corresponds to the lowest time index, indicating that the direct path (or a close indirect path length within the resolution of the power delay profile) provides the strongest power.

In other environments, an indirect path between the receiver and the transmitter may have the strongest component of the power delay profile. For example, if a user is standing between the transmitter and the receiver, a indirect path corresponding to a bounce off a wall may have a stronger signal. For example, in FIG. 2B, the strongest components 212 corresponds to an indirect path having a 25 ns longer ToF than the direct path.

The example method may further include block 105. Block 105 may include obtaining a path loss exponent from the direct path energy estimate and the RSSI. If the direct path is blocked, then the path loss exponent may be expected to be larger than if the direct path is unblocked. Additionally, if the direct path is blocked, then the direct path energy may be expected to be less than the RSSI. If the direct path is unblocked, then the direct path energy may be close to the RSSI. Accordingly, the path loss exponent may be determined from the direct path energy estimate and the RSSI.

In some implementations, a line of sight likelihood factor ($l_{factor}$) may be determined by calculating a ratio between the direct path energy estimate and the RSSI. For example, the line of sight likelihood factor may be calculated as:

$$l_{factor} = \frac{DPE}{RSSI}. \quad (4)$$

Figure 3:
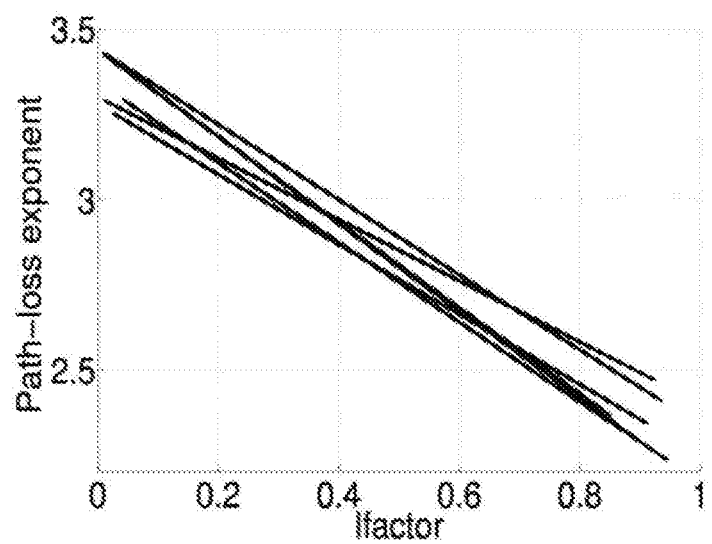
FIG. 3 illustrates example relationships between line of sight likelihood factors and path loss exponents.

A relationship between path loss exponents and line of sight likelihood factors may be used to determine the path loss exponent from the line of sight likelihood factor. For example, the receiving node may store the relationship, which may be determined specifically for the receiving node or as a general relationship encompassing many device types. For example, FIG. 3 illustrates five different relationships for five different APs.

The example method may further include block 106. Block 106 may include determining a distance estimate between the receiving node and the transmitting node from the path loss exponent and the direct path energy estimate. For example, the distance estimate may be determined by solving the path loss equation (Eq. 1) to determine a distance estimate estimating the length between the receiving node and the transmitting node. For example, the path loss equation may be solved for d using the path loss exponent determined in block 104, and the direct path energy estimate as $P_R$.

Figure 4:
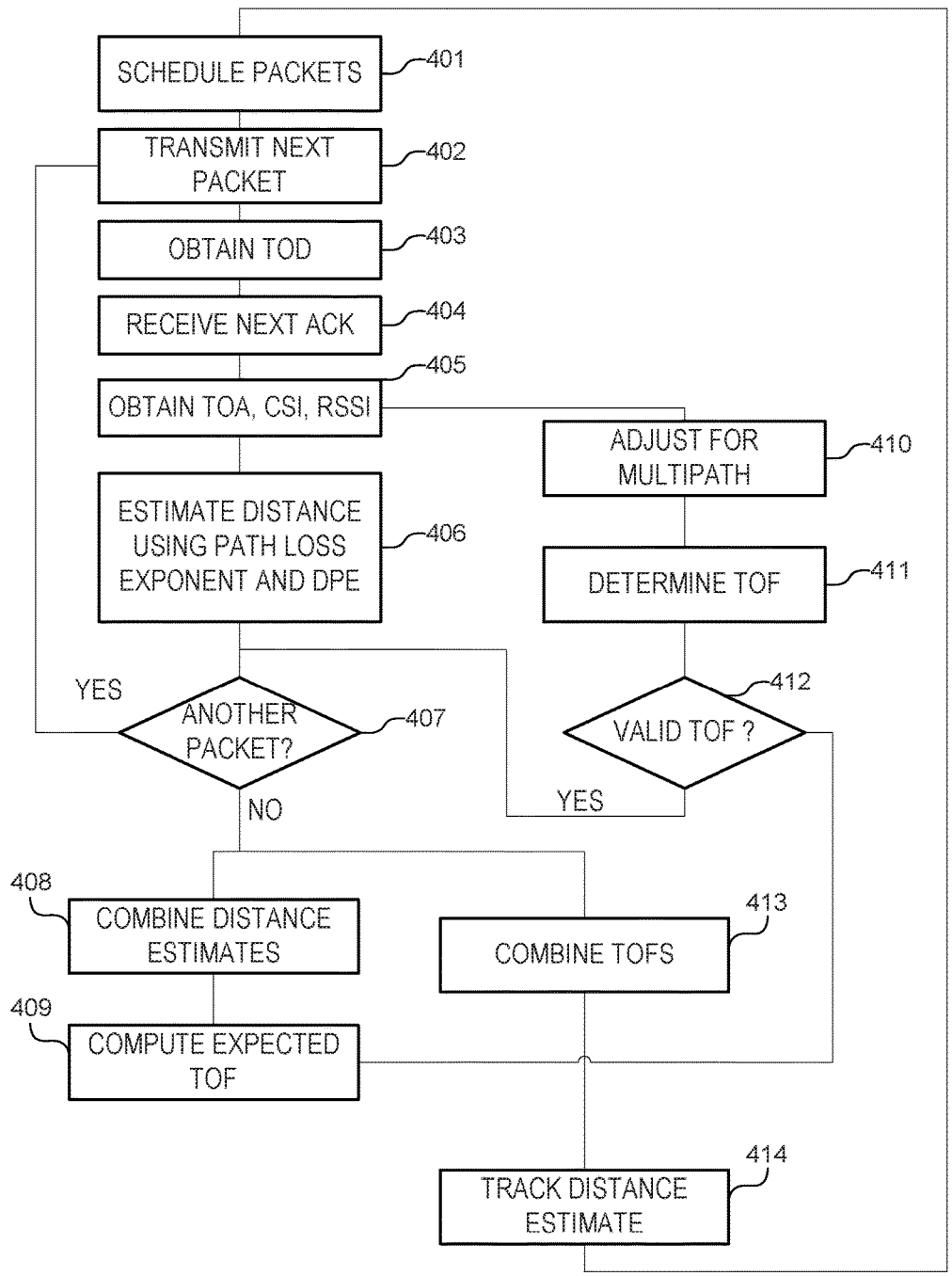
FIG. 4 illustrates an example method of distance estimation using ToF between two nodes.

In some implementations, the direct path energy may be further used to estimate the ToF between the receiving node and the transmitting node. FIG. 4 illustrates an example method of distance estimation using ToF between two nodes. As discussed below, in this example method, the example method of FIG. 1 is performed to validate estimated ToFs.

The example method may include block 401. Block 401 may include scheduling a plurality of data packets for transmission to a node. For example, an AP may perform block 401 to schedule a plurality of packets for transmission to a mobile device. The AP may be the receiving node and the mobile device may the transmitting node described with respect to FIG. 1. In some cases, ToF between the nodes may be determined for each packet and its ACK. In some environments, as a mobile device moves, the direct path may stay relatively constant over short time frames. However, indirect paths may vary quickly over the same short time frames. Accordingly, scheduling a plurality of packets, such as 10 packets, within a timeframe, such as 1 sec, may be used to isolate the direct path contributions to the ToF.

The example method may include block 402. Block 402 may include transmitting a next (or first) packet of the packets scheduled in block 401. For example, the transmitted packet may be a previous packet to an ACK packet used for distance estimation in accordance with the method of FIG. 1. The example method may further include block 403. Block 403 may include obtaining an estimated time of departure (ToD) of the packet transmitted in block 402. For example, the PHY may provide the ToD upon transmitting the packet.

The example method may also include block 404. Block 404 may include receiving an ACK to the packet transmitted in block 402. For example, block 401 may be performed as described above with respect to block 101 of FIG. 1.

The example method may also include block 405. Block 405 may include obtaining channel state information (CSI) from the packet received in block 404. For example, the CSI may be obtained as described with respect to block 102 of FIG. 1.

Block 405 may also include determining an estimated time of arrival (ToA) of the packet received in block 404. For example, the estimated ToA may be provided by the PHY of the receiving node. In some cases, the estimated ToA value corresponds to the instant when the preamble of the ACK signal is detected. In some implementations, such as those utilizing an 802.11x protocol, preamble detection at the PHY may involve an orthogonal frequency division multiplexing (OFDM) symbol detection and correlation operation. This preamble detection may be subject to various sources of uncertainty. In some cases, the ToA estimate may have a standard deviation of up to 50 ns, corresponding to a length error of up to 15 m. As discussed herein, the ToA estimate may be adjusted to correct for errors due to multipath. Additionally, as discussed herein, the ToF may be tracked using approaches such as Kalman filters to correct for other sources of error in preamble detection.

Block 405 may further include obtaining an RSSI for the ACK received in block 404. For example, block 405 may be performed as described with respect to block 103 of FIG. 1.

The example method further includes block 406. Block 406 may include determining a distance estimate between the transmitter and receiver using a path loss exponent and direct path energy estimate. For example, block 406 may be performed as described with respect to block 104-106 of FIG. 1. As another example, block 406 may be performed by using the RSSI as $P_R$ in the path loss equation, Eq. 1, to determine a rough distance estimate between the transmitter and receiver.

The example method further includes block 407. In block 407 if another packet has been scheduled, then the method proceeds back to block 402 to exchange another data packet and ACK and to determine another distance estimate. If another packet has not been scheduled, then the method may proceed to blocks 408 and 413.

Block 408 may include combining the distance estimates calculated in each performance of block 406. For example, the distance estimates may be combined by averaging. The combined distance estimates may serve as an expected distance used to validate another distance estimate, as described below. If the other distance estimate is a ToF estimate, then the method may include block 409 to convert the length determined in block 408 into a ToF.

In some implementations, the example method may include block 410. Block 410 may include adjusting the ToA estimate to correct for multipath effects. In one implementation, adjusting for multipath may include using the power delay profile calculated in block 406. In another implementation, adjusting for multipath may include calculating a power delay profile from the CSI. For example, the power delay profile may be determined as described with respect to block 104 of FIG. 1. Adjusting for multipath may further include determining an arrival time of a strongest component of the power delay profile. If the strongest component is not the first component of the power delay profile, then the ToA reported by the PHY in block 405 may be adjusted by the arrival time of the strongest component of the power delay profile to determine the estimated ToA. For example, if idx is the index of the strongest component, the ToA may be adjusted by subtracting tm from the ToA, where tm is calculated as:

$$t_m = idx * R, \quad (5)$$

where R is the resolution of the power delay profile.

In some implementations, the ACK may be received by multiple antennas. For example, the method may be performed by an AP having multi-in multi-out (MIMO) capabilities. In these implementations, the CSI obtained in block 405 may capture the channel characteristics for each subcarrier of the signal and each antenna. Block 410 may include determining a plurality of power delay profiles for a corresponding plurality of antennas. In these cases, the strongest component of the power delay profile may be the strongest component across all of the power delay profiles. In some cases, increasing the number of antennas at the AP may effectively increase the multipath detection resolution. Accordingly, ToF estimation error may decrease with increasing number of antennas.

The example method also includes block 411. Block 411 may include determining a distance estimate between the receiving node and the transmitting node using the estimated ToD and the estimated ToA. For example, the distance estimate may be determined as an estimated ToF between the receiving node and the transmitting node. In some implementations, the estimated ToA may be the ToA obtained in block 405. In other implementations, block 409 may be performed and the estimated ToA may be the adjusted ToA determined in block 409. In some implementations, the ToF may be calculated by subtracting the ToA from the ToD and further subtracting various constants. For example, the estimated ToF may be calculated as:

$$ToF = ToA - ToD - t_{sifs} - t_{off} - t_{pd}, \quad (6)$$

where $t_{sifs}$ is an protocol mandated interframe spacing period, such as the 802.11 Standard Interframe Spacing (SIFS) period, $t_{off}$ is an offset time in addition to the SIFS that the transmitting devices waits before transmitting the ACK, and $t_{pd}$ is a preamble detection time resulting from the PHY layer performing OFDM symbol detection and correlation operations.

The example method may further include block 412. In block 412, the distance estimate from block 411 may be compared to the expected distance from block 409 to determine if the second distance estimate is an outlier. For example, if the ToF estimated in block 411 is exceeds the expected ToF from block 409 by a certain percentage or by a certain time, then the estimated ToF from block 411 may be considered an outlier. If the estimated ToF is an outlier or invalid, then it may be discarded. If not, then the estimated ToF may be considered valid and saved. If the ToF is valid, then the method may proceed to block 407. If another packet exchange is scheduled, then the method may repeat from block 402 to determine another estimated ToF. If there are no more packets scheduled, then the method may proceed to block 413. In some implementations, validated the distance estimates from block 411 may reduce the effect of large variations in preamble detection at the PHY resulting from noise other than multipath effects.

In block 413 the distance estimates from blocks 411 validated in block 412 may be combined to determine a refined distance estimate. For example, the validated ToFs may be combined by averaging to determine an average ToF or combined by determining a median ToF. In some implementations, this refined distance estimate may be reported as a final estimate of the distance between the two network nodes. For example, the final distance estimate may be reported as a ToF between the nodes or as a length between the nodes. This may be used in various processes, such as localization of one of the network nodes, in a ranging based routing process, or transmission power adjustment.

In other implementations, the example method may include block 414 to provide a tracked distance estimate. For example, block 414 may include combining the refined distance estimate with a previously determined refined distance estimate to provide the tracked distance estimate. In some implementations, block 414 may include using a Kalman filter to track the distance estimate. For example, the Kalman filter may track the distance and velocity of the node that transmitted the ACK received in block 404. A previous estimate of the distance and velocity may be used to predict the current distance. This may be compared and combined with the output of block 413 and updated to provide a final estimate of the current distance (and velocity) of the transmitting node. This final estimate may be saved and used as the previous estimate in a subsequent performance of the method from block 401. In some implementations, the Kalman filter may be initialized using the first distance measurement from the first performance of the method from block 401. The Kalman filter may be further initialized using a velocity of zero. In some cases, the velocity used in the Kalman filter may be limited to deal with noise. For example, the Kalman filter may be limited to 2 m/s or the approximate upper bound of human walking speed indoors.

Figure 5:
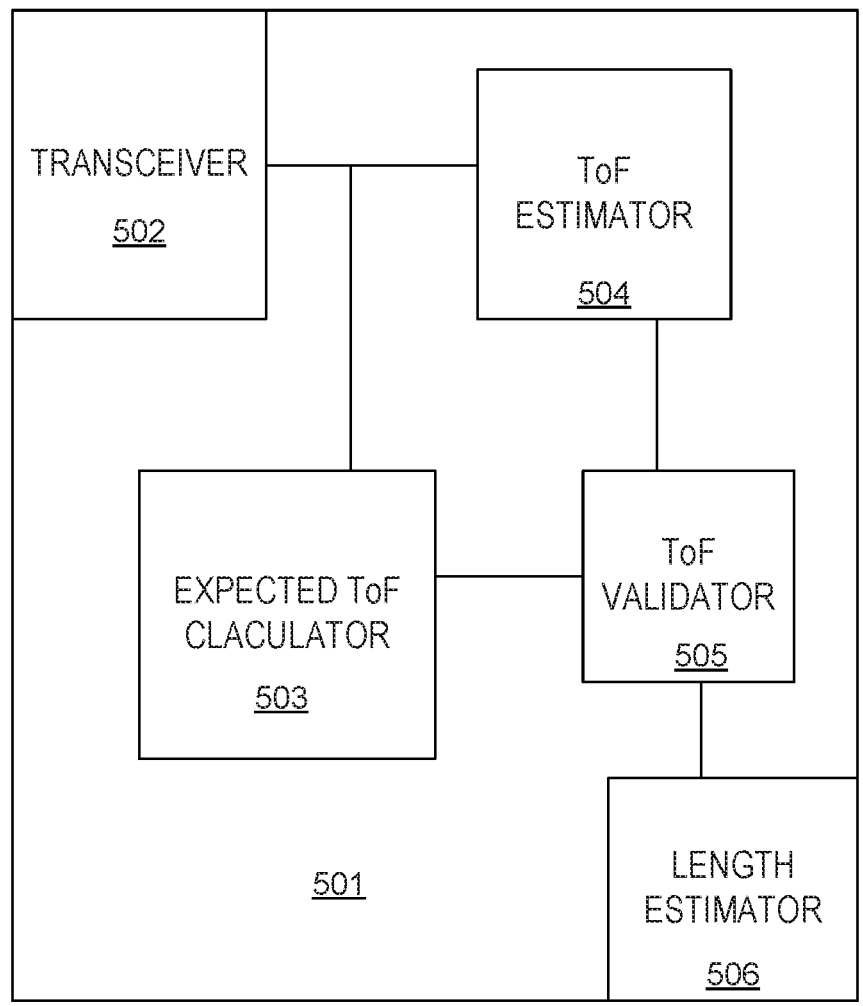
FIG. 5 illustrates an example system having a length estimator to provide a length estimate from the system to a network device.

FIG. 5 illustrates an example system 501 having a length estimator 506 to provide a length estimate from the system 501 to a network device. For example, the example system 501 may be configured to perform a method of distance estimation such as the method illustrated with respect to FIG. 4. In some implementations, the example system 501 may be a wireless access point (AP). In other implementations, the example system 501 may be a mobile device connected to an AP. In still further implementations, the example system 501 may be one of various network devices, such as a sensor in a sensor network or a node in a mesh network. In some cases, the illustrated modules may be implemented in hardware or in software stored on a non-transitory computer readable medium.

The example system 501 may include a transceiver 502. For example, the transceiver 502 may include a Wi-Fi chipset for communicating with other network devices in accordance with an 802.11x communications protocol such as 802.11n or 802.11ac. The transceiver 502 may be configured to transmit a plurality of data packets and to receive a corresponding plurality of acknowledgement packets from a network device. For example, the transceiver 502 may be configured to exchange a number of data packets and acknowledgement packets (ACKs) with the network device in a certain time. For example, the transceiver 502 may conduct 10 exchanges in a second. For example, the transceiver 502 may conduct the exchanges as described with respect to blocks 402 and 404 of FIG. 4. Additionally, the transceiver 502 may be configured to report various data to other system modules. For example, the transceiver 502 may include a PHY layer configured to report the times of departure (ToDs) of the transmitted data packets. The PHY layer may be further configured to report times of arrival (ToAs), channel state information sets (CSIs), and received signal strength indicators (RSSIs) for the received ACKs. For example, the transceiver 502 may report this information as described with respect to blocks 102 and 103 of FIG. 1 or blocks 403 and 405 of FIG. 4.

The example system 501 may also include an expected time of flight (ToF) calculator 503. For example, the expected ToF calculator 503 may be implemented as computer executable instructions stored on a non-transitory medium and executed by a processor. The expected ToF calculator 503 may be configured to use a plurality of CSIs to determine a plurality of direct path energy estimates and a plurality of path loss exponents. The plurality of CSIs may be reported by the transceiver 502 and may correspond to the plurality of acknowledgement packets received by the transceiver 502. In some implementations, the direct path energy estimates may be determined as described with respect to block 104 of FIG. 1 and block 406 of FIG. 4. Additionally, path loss exponents may be determined as described with respect to block 105 of FIG. 1 and block 406 of FIG. 4. For example, the expected ToF calculator 503 may perform block 406 for each of the plurality of ACKs received by the transceiver.

The expected ToF calculator 503 may be further configured to determine an expected ToF using the plurality of direct path energy estimates and the plurality of path loss exponents. For example, as described above, the expected ToF calculator 503 may solve the path loss equation for each of ACK packets to determine a plurality of length estimates. The plurality of length estimates may be averaged to determine an expected length estimate to the network device. This expected length estimate may be converted to the expected ToF using Eq. (2).

The system 501 may further include a ToF estimator 504. The ToF estimator 504 may be configured to determine a plurality of estimated times of flight (ToFs) to the network device using the plurality of CSIs. For example, the ToF estimator 504 may determine the estimated ToFs as each difference between the ToA of each ACK and the ToD of its corresponding ToD. The ToF estimator 504 may further correct the ToAs using the CSIs to determine a time offset corresponding to a strongest component of the corresponding power delay profiles. For example, the ToF estimator 504 may be configured to perform blocks 410 and 411 of FIG. 4 for each of the packets and ACKs transmitted and received by the transceiver 502. Accordingly, in some implementations, the ToF estimator 504 may be to use a plurality of power delay profiles determined from the plurality of CSIs to determine the plurality of estimated ToFs.

The system 501 may further include a validator 505. The validator 505 may be configured to compare each ToF of the plurality of estimated ToFs to the expected ToFs. The validator 505 may be further configured to discard invalid estimated ToFs to provide a validated plurality of estimated ToFs. For example, the validator 505 may perform block 412 of FIG. 4 for each of the estimated ToFs provided by the ToF estimator 504.

The system 501 may further include a length estimator 506. The length estimator 506 may be configured to use the validated plurality of estimated times of flight to provide a length estimate to the network device. For example, the length estimator 506 may use the validated plurality of estimated times of flight to determine a median time of flight. The length estimator 506 may use the median time of flight to determine the length estimate of the length to the network device. For example, the length estimator 506 may perform block 413 to determine the length estimate. In some implementations, the length estimator 506 may provide the length estimate to a further system module. In other implementations, the length estimator 506 may store the length estimate for further use. For example, the length estimator 506 may store the length estimate on a non-transitory computer readable medium.

Figure 6:
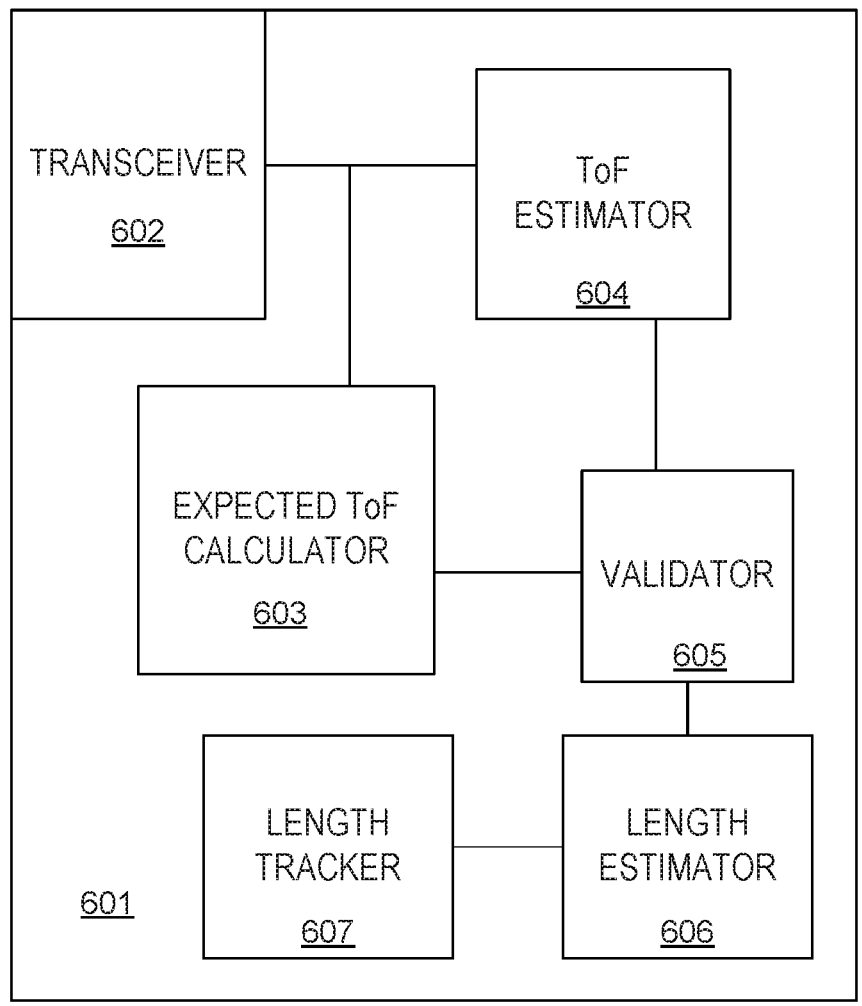
FIG. 6 illustrates a second example system having a length tracker to provide a length estimate from the system to a network device.

FIG. 6 illustrates a second example system 601 having a length tracker 607 to provide a length estimate from the system 601 to a network device. For example, the example system 601 may be configured to perform a method of distance estimation such as the method illustrated with respect to FIG. 4. In some implementations, the example system 601 may be a wireless access point (AP). In other implementations, the example system 601 may be a mobile device connected to an AP. In still further implementations, the example system 601 may be one of various network devices, such as a sensor in a sensor network or a node in a mesh network. In some cases, the illustrated modules may be implemented in hardware or in software stored on a non-transitory computer readable medium.

The example system 601 may include a transceiver 602, an expected ToF calculator 603, a ToF estimator 604, a validator 605, and a length estimator 606. These modules may implemented as described with respect to transceiver 502, expected ToF calculator 503, ToF estimator 504, validator 605, and length estimator 506 of FIG. 5, respectively.

The example system 601 may further include a length tracker 607. The length tracker 607 may be configured to use the length estimate provided by length estimator 606 and a previous length estimate the network device to provide a current length estimate. For example, the length tracker 607 may use the length estimate and the previous length estimate as inputs into a Kalman filter. The previous length estimate may be a preceding output of the Kalman filter. The output of the Kalman filter may be an estimate of the current length from the system 601 to the network device. This estimate may be saved or provided to other modules for further operations, such as ranging, localization, or routing. Additionally, it may be used as an input to the Kalman filter after a subsequent operation of the modules 602-606.

Figure 7A:
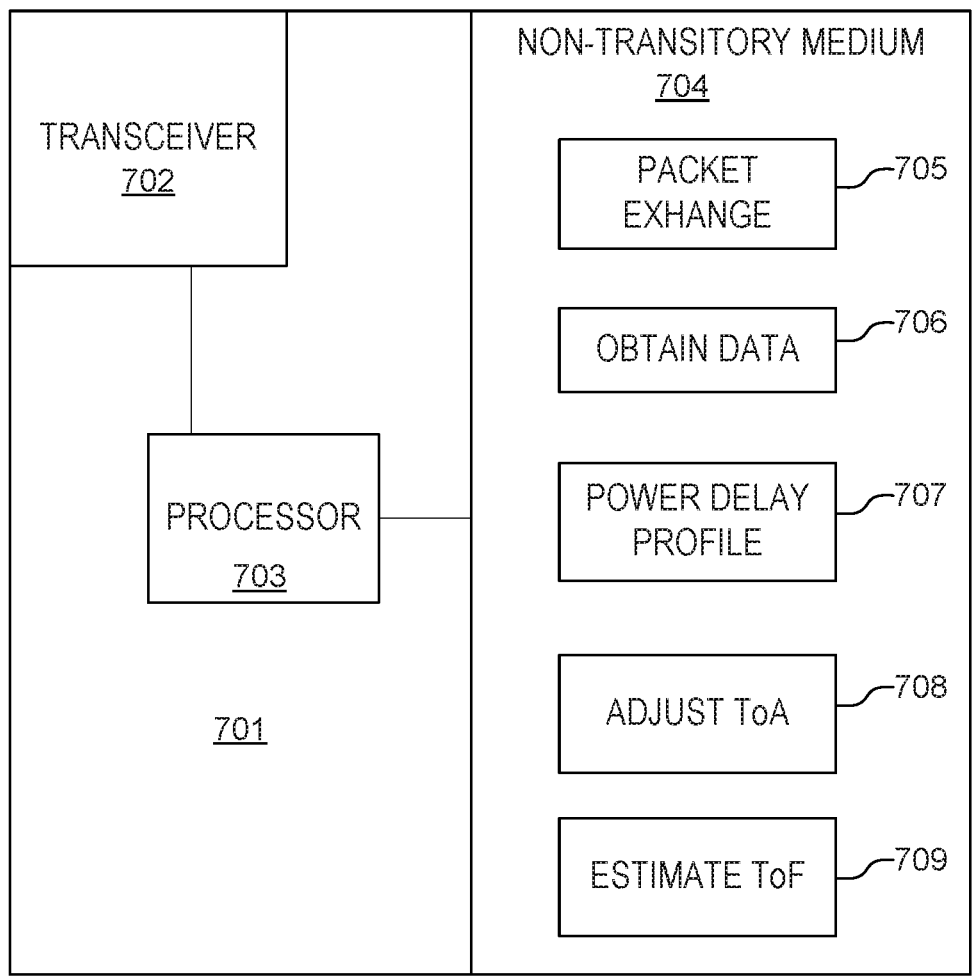
FIGS. 7A and 7B illustrate implementations of an example system having a non-transitory medium storing instructions executable by a processor to determine an estimated time of flight from the system to a network node.
Figure 7B:
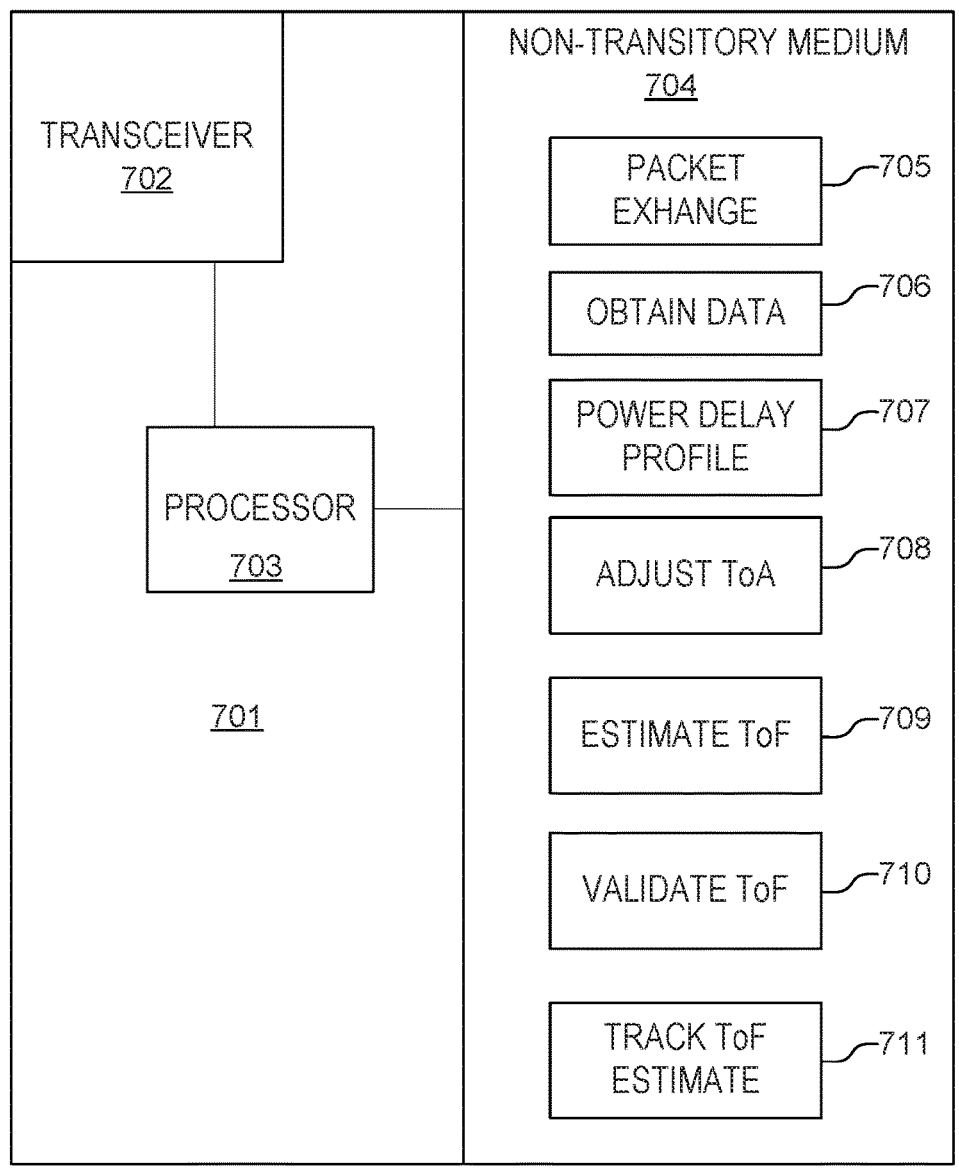

FIGS. 7A and 7B illustrate implementations of an example system 701 having a non-transitory medium 704 storing instructions executable by a processor 703 to determine an estimated time of flight from the system 701 to a network node. For example, the example system 701 may be an implementation of an example system 501 or 601 described with respect to FIG. 5 or 6, respectively. In some implementations, the system 701 may be an AP, a mobile device, or other network node.

The example system 701 may include a transceiver 702. For example, the transceiver 702 may be a Wi-Fi chipset. The transceiver 702 may be provided data to transmit by the processor 703. Additionally, the transceiver 702 may be capable of providing received data to the processor 703 and providing data regarding transmitted or received packets to the processor 703.

The example system 701 may further include processor 703. The processor 703 may be coupled to a non-transitory medium 704 and may be capable of executing instructions 705-709 stored on the medium 704. For example, the processor 703 may be a network controller of an AP or a controller of a mobile device.

The example system 701 may further include a non-transitory medium 704. For example, the medium 704 may be volatile or non-volatile memory or storage such as random access memory or flash memory. The medium 704 may store various instructions sets executable by the processor to perform operations as described below.

In some implementations, the medium 704 may store instruction set 705 executable by the processor 703 to exchange packets with a network node. Instruction set 705 may be executable by the processor 703 to transmit a data packet to the network node. For example, the processor 703 may provide the data packet to the transceiver 701 to be transmitted to the network node. In some cases, the instruction set 705 may be executable by the processor to perform step 402 of FIG. 4. Instruction set 705 may be further executable by the processor 703 to receive an acknowledgement packet (ACK) from the network node. For example, the processor 703 may instruct the transceiver 702 to receive the ACK and provide various data regarding the ACK.

In some implementations, the instruction set 705 may be further executable by the processor 703 to schedule a plurality of packet exchanges with the network node. For example, the instruction set 705 may be executable by the processor 703 to perform block 401 of FIG. 4. In these implementations, the instruction set 705 may be executable by the processor 703 to transmit and receive a plurality of data packets and ACKs.

In some implementations, the medium 704 may store instruction set 706. Instruction set 706 may be executable by the processor 703 to obtain various data from the transceiver. In some cases, the instructions 706 are executable to obtain an estimated time of departure of the data packet. For example, the estimated time of departure may be reported by a PHY layer module of the transceiver 701 as described above. The instructions 706 may be further executable by the processor 703 to obtain a preliminary estimated ToA of the ACK. For example, the preliminary estimated ToA may be a ToA of the ACK reported by the transceiver 701 as described above. The instructions 706 may be further executable by the processor 703 to obtain an RSSI and CSI corresponding to the ACK. For example, the instructions 706 may be executable by the processor 703 to perform blocks 102 and 103 of FIG. 1 or block 405 of FIG. 4.

In some implementations, the instruction set 706 may be further executable to obtain this data for each of a plurality of packet exchanges. For example, for each packet exchange in a schedule set by the processor 703 while executing the instruction set 705.

The medium 704 may further store instruction set 707. The instruction set 707 may be executable by the processor 703 to determine a power delay profile from the CSI. For example, the instruction set 707 may be executable by the processor 703 to perform an IFFT on the CSI to determine the power delay profile as described with respect to blocks 104 and 410 of FIGS. 1 and 4, respectively. Additionally, if the transceiver 701 has multiple antennas, the instruction set 707 may be executable by the processor 703 to determine a power delay profile for each antenna, as described above.

The medium 704 may further store instruction set 708. The instruction set 708 may be executable by the processor 703 to determine an adjusted estimated ToA by using the power delay profile to adjust the preliminary estimated ToA. For example, the instruction set 708 may be executable by the processor 703 to determine an index the strongest component of the power delay profile, or power delay profiles. The index may be used to determine an offset time used to adjust the preliminary estimated ToA as discussed above.

The medium 704 may further store instruction set 709. Instruction set 709 may be executable by the processor 703 to use the estimated ToD and the adjusted estimated ToA to determine an estimated ToF to the network node. For example, the instruction set 709 may be executable by the processor to determine the estimated ToF as described with respect to block 411 of FIG. 4. Additionally, the instruction set 709 may be executable by the processor 703 to store the ToF in the medium 704 or use the estimate ToF in a further operation.

FIG. 7B illustrates an implementation of the example system 701 including instructions 710, 711 to validate the ToF estimate and track a tracked ToF estimate.

In some implementations of the system 701, medium 704 stores instruction set 710. Instruction set 710 may be executable by the processor 703 to validate the ToF determined by the processor 703 executing instructions 709. The instruction set 710 may be executable by the processor 703 to determine a direct path energy estimate for the ACK. For example, the direct path energy estimate may be selected as the first component of the power delay profile determined by the processor executing instruction 707. The instruction set 710 may be further executable to determine a second estimated ToF from the direct path energy estimate. For example, the instructions 710 may be executable to determine a path loss exponent from the direct path energy estimate and an RSSI obtained by executing instructions 706. The path loss exponent may be used to determine the second estimated ToF as described with respect to blocks 406 and 409. The instructions 710 may be further executed to validate the first ToF by determine if the first estimated time of flight is within a range of the second estimated time of flight. For example, as described above the range may be a percentage or time above and below the second ToF.

In further implementations of the system 701, the instructions 710 may be executable to determine a plurality of direct path energy estimates from a corresponding plurality of transmissions from the network node. The instructions 710 may be further executable to use the plurality of direct path energy estimates to determine a plurality of distance estimates. The instruction 710 may be executed to combine the plurality of distance estimates to determine an expected distance and determine an expected ToF from the expected distance. For example, the instructions 710 may be executable by the processor 703 to perform blocks 401-409 of FIG. 4. In these implementations, the instructions 710 may be executable to determine if the first estimated ToF is within a range of the expected ToF to validate the first estimated ToF. For example, the instructions 710 may be executable to perform block 412 of FIG. 4.

In some implementations, the medium 704 also stores instruction set 711. The instruction set 711 may be executable by the processor 703 to use the first estimated ToF to refine a tracked ToF estimate. For example, the instruction set 711 may be executed if it is determined by executing instructions 710 that the first estimated ToF is within a range of the second estimated ToF. As another example, instruction set 711 may be executed if it is determined by executing instructions 710 that the first estimated ToF is within a range of the expected ToF. In some implementations, instructions 711 may be executed to use the first estimated ToF in a Kalman filter to refine the tracked ToF estimate. For example, instructions 711 may be executable by the processor 703 to perform block 414 of FIG. 4.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
receiving, at a receiving node, a packet from a transmitting node, wherein the packet is an acknowledgement packet for a data packet;
obtaining channel state information from the packet;
obtaining a received signal strength indicator from the packet;
determining a direct path energy estimate from the channel state information;
determining a path loss exponent from the direct path energy estimate and the received signal strength indicator; and
determining a first distance estimate between the receiving node and the transmitting node from the path loss exponent and the direct path energy estimate;
obtaining an estimated time of departure of the data packet;
obtaining an estimated time of arrival of the packet;
determining a second distance estimate between the receiving node and the transmitting node using the estimated time of departure and the estimated time of arrival;
comparing the second distance estimate to an expected distance determined from the first distance estimate to determine if the second distance estimate is an outlier; and
if the second distance estimate is not an outlier, combining the second distance estimate with a previously determined distance estimate to determine a refined distance estimate.

2. The method of claim 1, further comprising determining the direct path energy estimate by:
performing an Inverse Fourier Transform on the channel state information to determine a power delay profile; and
selecting a first component of the power delay profile as the direct path energy estimate.

3. The method of claim 1, further comprising determining the path loss exponent by:
determining a line of sight likelihood factor as a ratio between the direct path energy estimate and the received signal strength indicator; and
obtaining the path loss exponent from a relationship between path loss exponents and line of sight likelihood factors.

4. The method of claim 1, further comprising obtaining the estimated time of arrival of the packet by:
determining an arrival time of a strongest component of the power delay profile;
adjusting a reported time of arrival by the arrival time of the strongest component of the power delay profile to obtain the estimated time of arrival.

5. The method of claim 4, further comprising:
determining a plurality of power delay profiles for a corresponding plurality of antennas of the receiving node, wherein the power delay profile is one of the plurality of power delay profiles; and
wherein the strongest component of the power delay profile is the strongest component of the plurality of power delay profiles.

6. The method of claim 1, further comprising determining the expected distance estimate by:
transmitting a second data packet to the transmitting node;
receiving a second acknowledgement packet from the transmitting node;
determining a third distance estimate between the receiving node from a second path loss exponent and a second direct path energy estimate; and
combining the third distance estimate and the first distance estimate to determine the expected distance.

7. A system, comprising:
a transceiver to transmit a plurality of data packets and to receive a corresponding plurality of acknowledgement packets from a network device;
an expected time of flight calculator, implemented as computer executable instructions stored on a non-transitory medium and executed by a processor, to:
use a plurality of channel state information sets corresponding to the plurality of acknowledgement packets to determine a plurality of direct path energy estimates and a plurality of path loss exponents, and
determine an expected time of flight using the plurality of direct path energy estimates and the plurality of path loss exponents;
a time of flight estimator, implemented as computer executable instructions stored on the non-transitory medium and executed by the processor, to determine a plurality of estimated times of flight to the network device using the plurality of channel state information sets;
a validator, implemented as computer executable instructions stored on the non-transitory medium and executed by the processor, to compare each time of flight of the plurality of estimated times of flight to the expected time of flight and to discard invalid estimated times of flight to provide a validated plurality of estimated times of Flight; and
a length estimator, implemented as computer executable instructions stored on the non-transitory medium and executed by the processor, to use the validated plurality of estimated times of flight to provide a length estimate.

8. The system of claim 7, wherein the time of flight estimator is to use a plurality of power delay profiles determined from the plurality of channel state information sets to determine the plurality of estimated times of flight.

9. The system of claim 7, further comprising a length tracker, implemented as computer executable instructions stored on the non-transitory medium and executed by the processor, to use the length estimate and a previous length estimate to the network device to provide a current length estimate.

10. A non-transitory computer readable medium storing instructions executable by a processor to:
transmit a data packet to a network node;
obtain an estimated time of departure of the data packet;

receive an acknowledgement packet from the network node;

obtain a preliminary estimated time of arrival of the acknowledgement packet;

determine a power delay profile from channel state information of the acknowledgement packet;

determine an adjusted estimated time of arrival by using the power delay profile to adjust the preliminary estimated time of arrival; and use the estimated time of departure and the adjusted estimated time of arrival to determine an estimated time of flight to the network node.

11. The non-transitory computer readable medium of claim 10 storing further instructions executable by the processor to:

determine a direct path energy estimate for the acknowledge packet;

determine a second estimated time of flight from the direct path energy estimate; and if the first estimated time of flight is within a range of the second estimated time of flight, use the first estimated time of flight to refine a tracked time of flight estimate.

12. The non-transitory computer readable medium of claim 11 storing further instructions executable by the processor to:

use the first estimated time of flight in a Kalman filter to refine the tracked time of flight estimate.

13. The non-transitory computer readable medium of claim 11 storing further instructions executable by the processor to:

determine a path loss exponent from a ratio of the direct path energy estimate and a received signal strength indicator; and determine the second estimated time of flight from the direct path energy estimate and the path loss exponent.

14. The non-transitory computer readable medium of claim 11 storing further instructions executable by the processor to:

determine a plurality of direct path energy estimates from a corresponding plurality of transmissions from the network node;

determine a plurality of distance estimates from the plurality of direct path energy estimates;

combine the plurality of distance estimates to determine an expected distance;

determine an expected time of flight from the expected distance; and if the first estimated time of flight is within a range of the expected time of flight, use the first estimated time of flight to refine a tracked time of flight estimate.

\* \* \* \* \*